United States Patent
Stratico et al.

(12) 
(10) Patent No.: US 6,834,421 B2
(45) Date of Patent: Dec. 28, 2004

(54) APPARATUS FOR DYNAMO-ELECTRIC MACHINE INSULATION HANDLING

(75) Inventors: Gianfranco Stratico, Siena (IT); Antonio Lumini, Florence (IT)

(73) Assignee: Axis USA Inc., Tampa, FL (US)

( * ) Notice: Subject to any disclaimer, the term of this patent is extended or adjusted under 35 U.S.C. 154(b) by 198 days.

(21) Appl. No.: 10/050,030

(22) Filed: Nov. 13, 2001

(65) Prior Publication Data

US 2002/0124381 A1 Sep. 12, 2002

Related U.S. Application Data

(60) Provisional application No. 60/248,255, filed on Nov. 14, 2000.

(51) Int. Cl.[7] .................. H02K 15/00; H02K 15/14; H02K 15/16
(52) U.S. Cl. .................. 29/596; 29/33 L; 29/564.6; 29/734; 83/262; 83/393; 310/215
(58) Field of Search .................. 29/596, 33 L, 29/564.6, 734, 887; 83/262, 393, 268; 310/215

(56) References Cited

U.S. PATENT DOCUMENTS

| 3,163,065 A | 12/1964 | Kolodgy et al. | |
| 3,514,836 A | 6/1970 | Mason | |
| 3,634,932 A | * 1/1972 | Mason | 29/596 |
| 3,643,317 A | 2/1972 | Arnold et al. | |
| 3,763,983 A | 10/1973 | James | |
| 3,829,953 A | 8/1974 | Lauer et al. | |
| 3,909,902 A | 10/1975 | Peters | 29/564.6 |
| 4,136,433 A | * 1/1979 | Copeland et al. | 29/564.6 |
| 4,389,011 A | 6/1983 | Lovibond | |
| 4,449,289 A | 5/1984 | Kindig | |
| 4,878,292 A | * 11/1989 | Santandrea et al. | 29/734 |
| 4,944,085 A | 7/1990 | Lautner et al. | |
| 4,984,353 A | 1/1991 | Santandrea et al. | |
| RE34,195 E | 3/1993 | Santandrea et al. | |
| 5,720,097 A | * 2/1998 | Randazzo et al. | 29/564.6 |

FOREIGN PATENT DOCUMENTS

| EP | 0 051 858 A | 5/1982 | H02K/15/10 |
| FR | 1574500 | 6/1969 | |
| SU | 736281 | 10/1977 | |

* cited by examiner

*Primary Examiner*—Carl J. Arbes
(74) *Attorney, Agent, or Firm*—Fish & Neave

(57) ABSTRACT

Methods and apparatus for insulating interior walls of lamination slots of dynamo-electric machine components are provided. The relative speeds and sequence of cutting, forming, and inserting a piece of insulation material into the slot of the lamination core of a dynamo-electric machine component may be determined by a central drive mechanism. The central driving mechanism may have a plurality of cams, rotating with a main shaft, to control the translations of cutting, forming and inserting members.

10 Claims, 5 Drawing Sheets

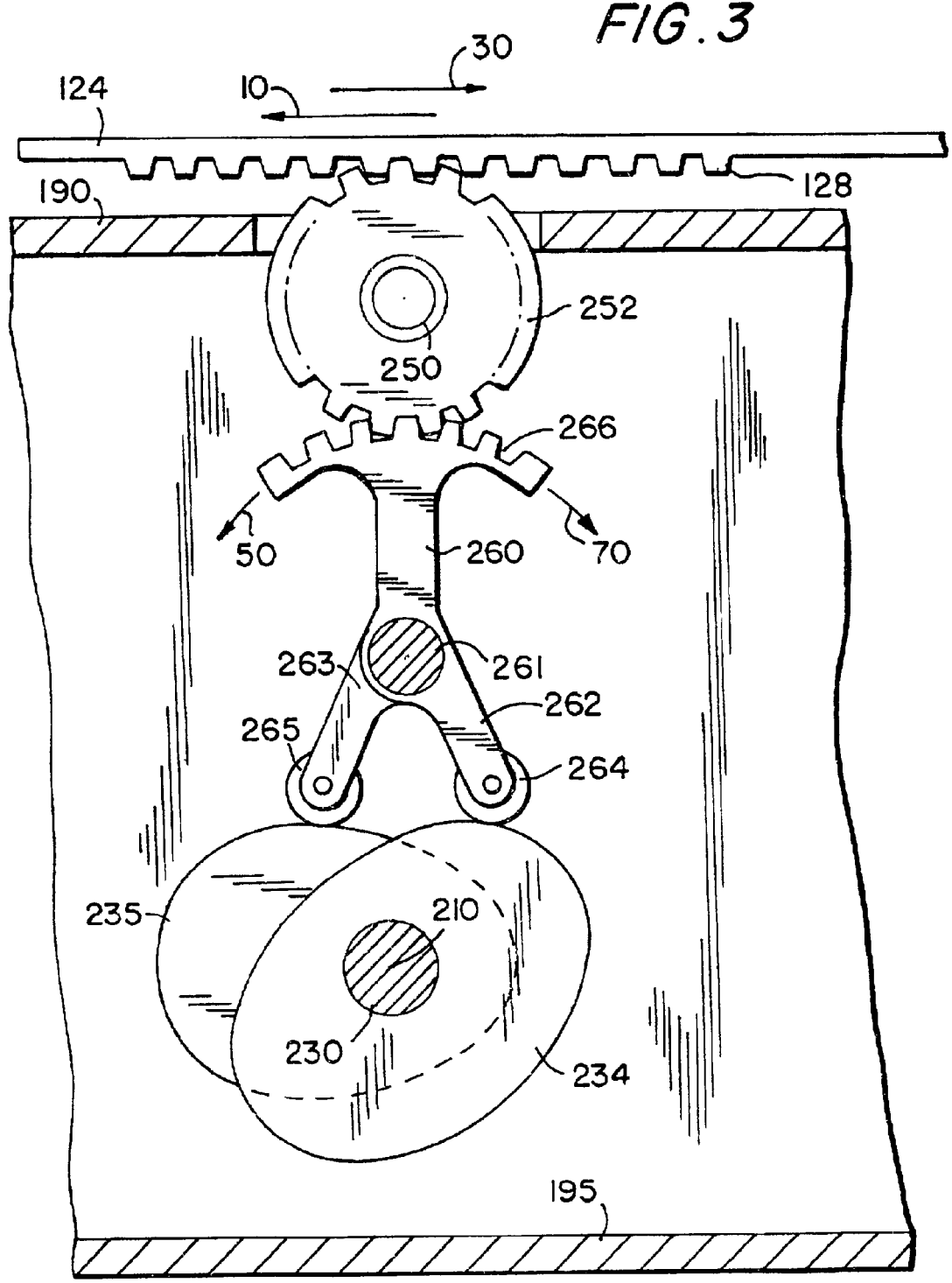

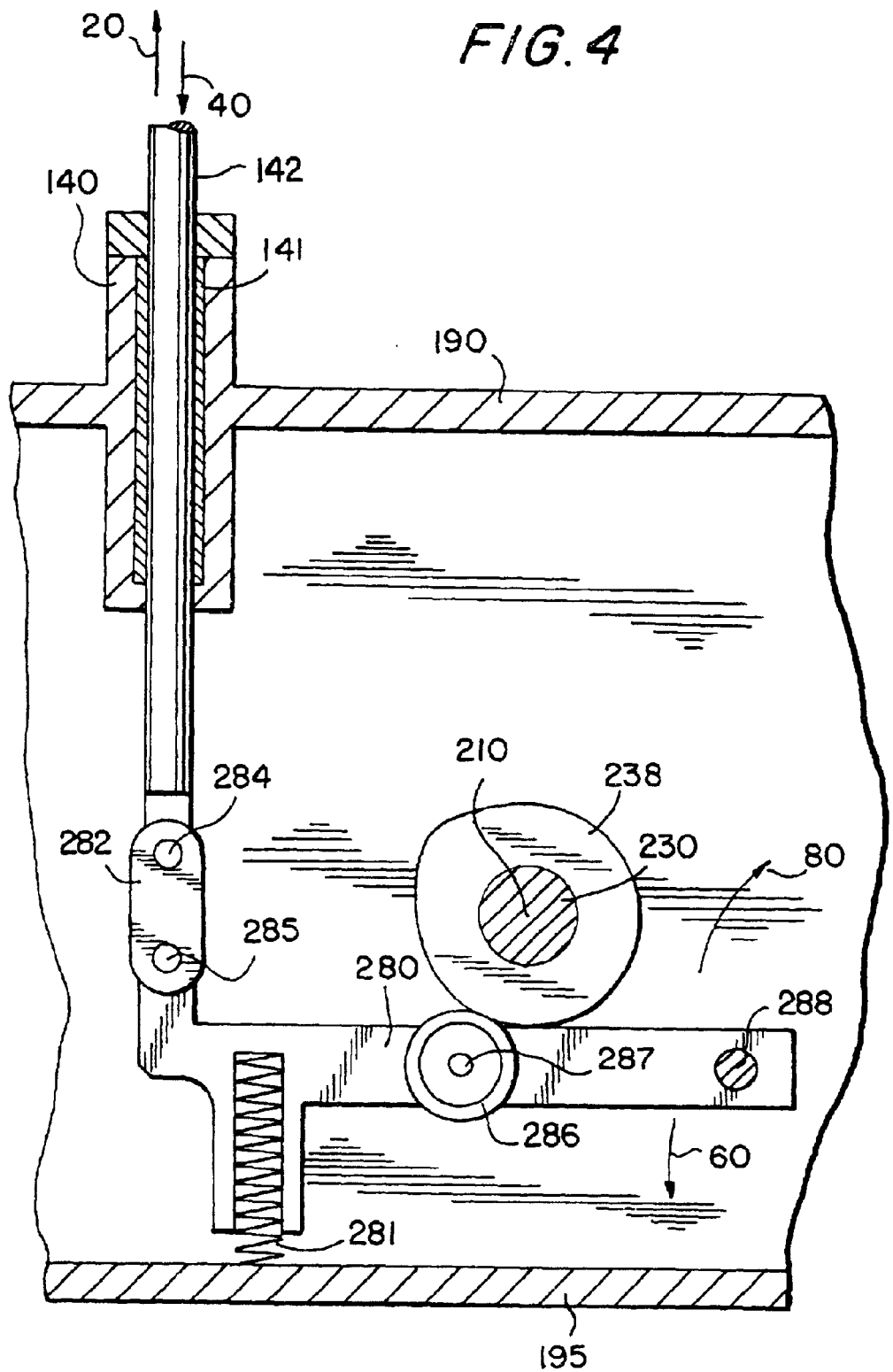

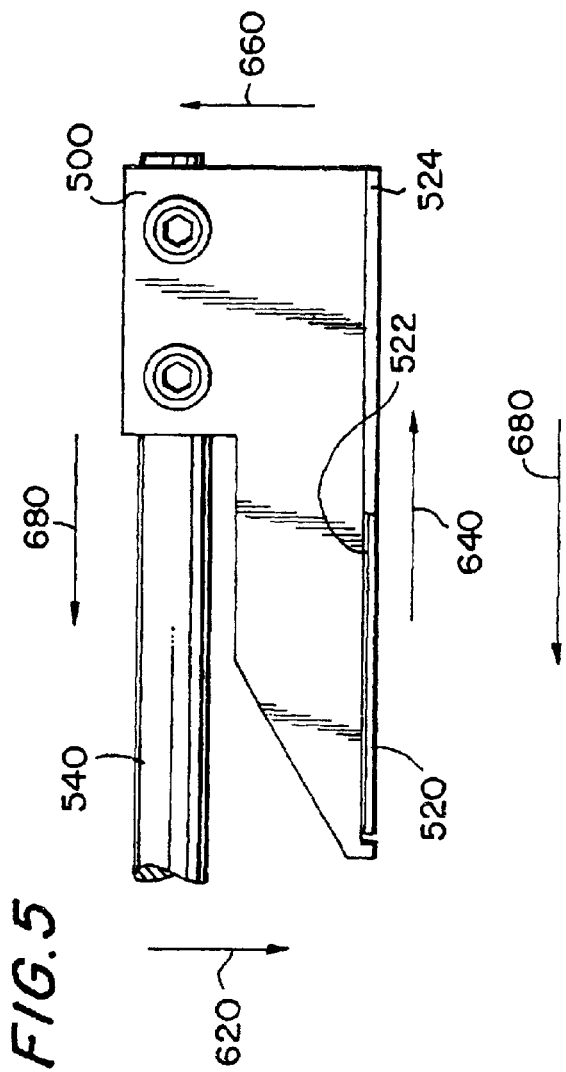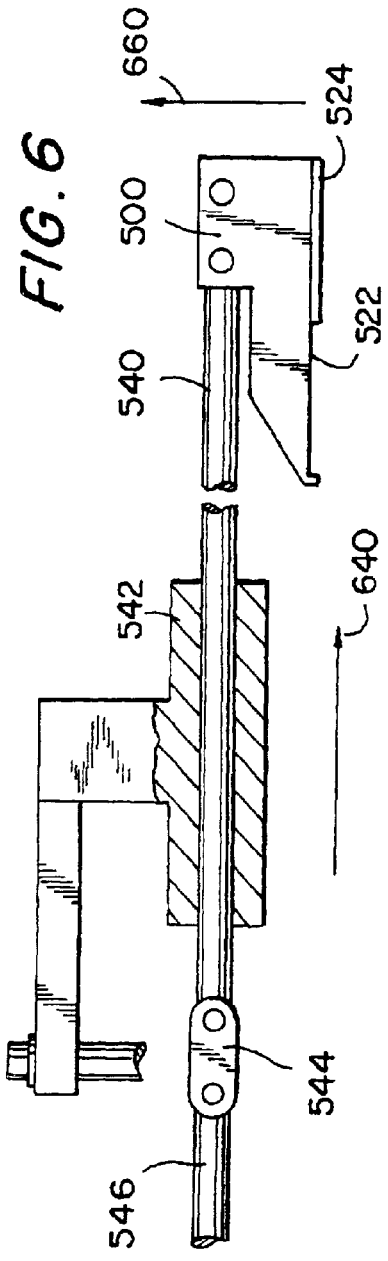

APPARATUS FOR DYNAMO-ELECTRIC MACHINE INSULATION HANDLING

CROSS REFERENCE TO RELATED APPLICATION

This application claims the benefit of U.S. Provisional Patent Application No. 60/248,255, filed Nov. 14, 2000.

BACKGROUND OF THE INVENTION

The present invention relates to methods and apparatus for insulating interior walls of lamination slots of dynamo-electric components. More particularly, the present invention relates to methods and apparatus for forming inserts of insulating material and inserting them into the slots of a lamination core of an armature in dynamo-electric components.

Various machines for insulating dynamo-electric components are known in the art. However, such machines typically have a large number of moving mechanical parts and are generally difficult to lubricate and maintain. Insulation material can become contaminated by lubricating procedures on some insulating handling machines. Other machines have enclosed insulation handling mechanisms to minimize contamination of the insulation, but such enclosures generally impede lubrication of internal mechanisms. In addition, closed configurations are cumbersome for setting up machine insulation operations or troubleshooting mechanical problems. These difficulties increase the likelihood of breakdown and lead to unsatisfactory levels of accuracy, reliability, and productivity.

Accordingly, it is desirable to provide methods and apparatus for inserting insulation into dynamo-electric machine components with a minimal number of mechanical parts and subsystems. It is also desirable to provide methods and apparatus for inserting insulation into dynamo-electric machine components that yield high accuracy and reliability. Additionally, it is desirable to provide methods and apparatus that perform insulation handling operations at high rates of speed, thereby increasing productivity. Furthermore, it is desirable to ease operator accessibility to the insulation handling mechanisms and to minimize the risk of lubrication contaminating the insulation material.

SUMMARY OF THE INVENTION

The present invention relates to methods and apparatus for cutting a strip of insulating material into a segment of predetermined length, forming the segment into a predetermined shape correlated with the slot of the lamination core, and inserting the segment into a related slot of the lamination core. Illustrative features of some embodiments of the present invention are described, for example, in U.S. Provisional Patent Application No. 60/248,255, filed Nov. 14, 2000, and U.S. Pat. No. 4,878,292, issued Nov. 7, 1989, currently U.S. Reissue Pat. No. 34,195, reissued Mar. 16, 1993 which are hereby incorporated by reference herein in their entirety.

The displacement and speed profiles of the operating members (e.g., a cutting member, a forming member, an inserting member, etc.) of the armature insulation machine may be controlled by a central drive mechanism. A centrally driven insulation insertion machine may have fewer moving parts, and thus may obtain higher accuracy and reliability of the cutting, forming, and inserting operations.

The central drive mechanism may include a rotatable shaft and several subsystems for transferring the shaft rotation into translations of the cutting, forming, and inserting members. The rate of the cutting, forming, and inserting may be related to the rate of rotation of the shaft. Increasing the rate of shaft rotation may increase the rate of insulation handling operations (e.g., cutting, forming, inserting, etc.) and thereby increase productivity. Each subsystem may include a plurality of cams that may rotate with the shaft. The plurality of cams may be coupled with one of the operating members so that the movements of the coupled operating member is controlled by the plurality of rotating cams. The cutting, forming, and inserting members may each be coupled to a respective subsystem.

The central drive mechanism may be enclosed to create a barrier between the drive mechanism and the insulation handling members (e.g., the cutting member, the forming member, the inserting member, etc.). This barrier may allow insulation to be handled externally (e.g., outside of the enclosure) and may prevent the insulation from being contaminated by lubricant for the drive mechanism. Furthermore, external insulation handling members may be more accessible to an operator than the internal handling members in some machines currently known in the art. Increased operator accessability may simplify procedures such as lubrication, startup, and shutdown.

BRIEF DESCRIPTION OF THE DRAWINGS

Further features of the invention, its nature, and various advantages will be more apparent from the following detailed description of the preferred embodiments and the accompanying drawings, wherein like reference characters refer to like elements throughout, and in which:

FIG. 3 is a partial section view, as seen from the direction of casing side 150 (illustrated in FIG. 1), of a subsystem of drive mechanism 200 (illustrated in FIG. 1) for controlling the inserting of a segment of insulation material into a lamination slot;

FIG. 4 is a partial section view, as seen from the direction of casing side 150 (illustrated in FIG. 1), of a subsystem of drive mechanism 200 (illustrated in FIG. 1) for controlling the cutting of a strip of insulation material;

FIG. 5 is illustrative of an inserting member which may be used to insert insulating members into dynamo-electric components in accordance with various embodiments of the present invention; and FIG. 6 is an expanded view of FIG. 5 illustrating the driving member which can be used for translating the inserting member in accordance with various embodiments of the present invention.

DETAILED DESCRIPTION OF THE PREFERRED EMBODIMENTS

The present invention is now described in more detail in conjunction with FIGS. 1–6, which are provided to illustrate embodiments of the invention and not for limiting same.

Figure 1:
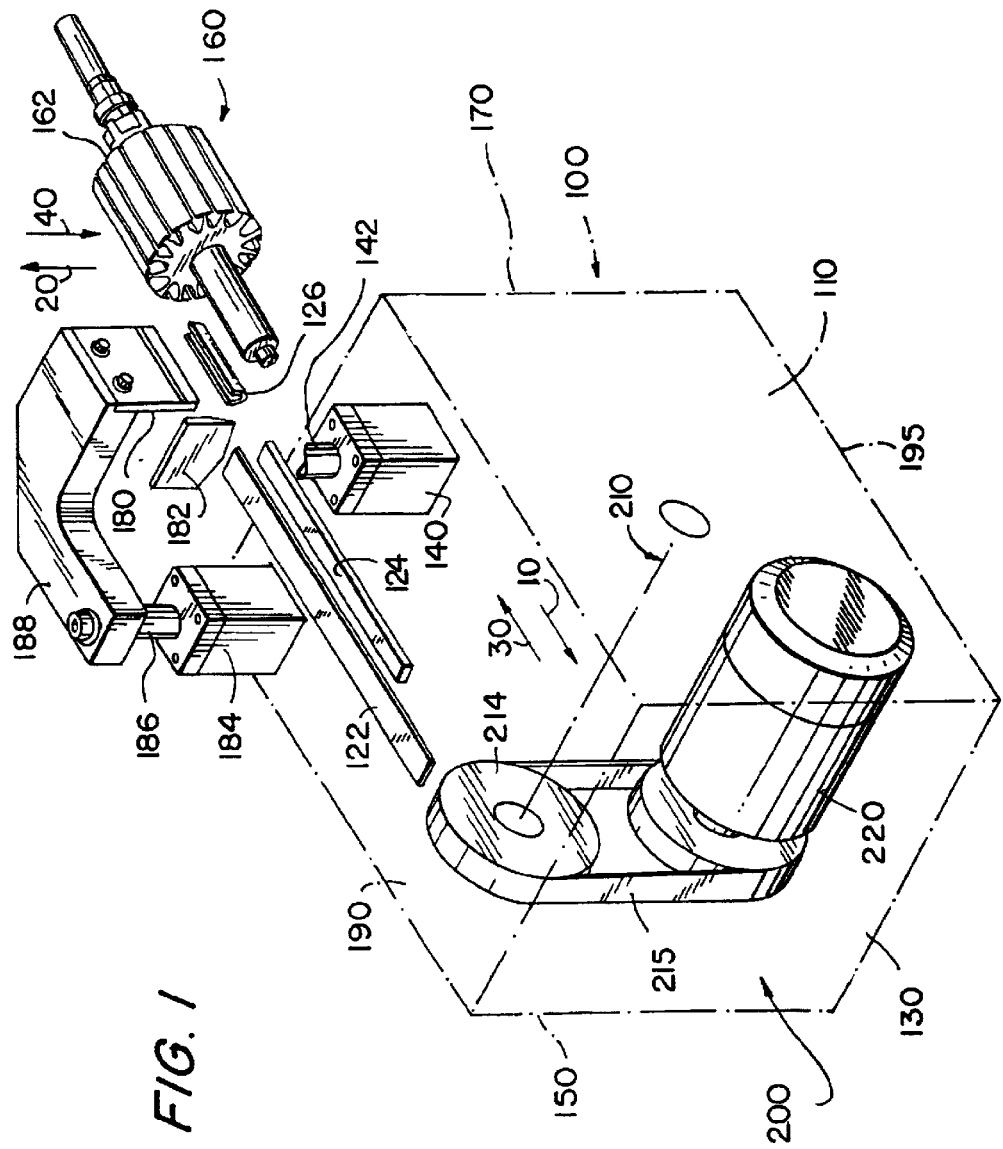
FIG. 1 is a perspective partial view of the insulating machine.

FIG. 1 depicts, in a perspective partial view, an illustrative insulating apparatus in accordance with various embodiments of the present invention. Certain parts (more fully identified in the following) are omitted for sake of clarity.

Drive mechanism 200 may be used to drive the movement, at predetermined timing, of cutting member 182, forming member 180, and inserting member 124. Insert 126, which may be any suitable insulating material, is shown in FIG. 1 already formed and aligned with slot 162 of armature 160, where it may be inserted by inserting member 124.

During typical use of the apparatus shown in FIG. 1, inserting member 124 may preferably translate in horizontal forward direction 30 to push insert 126 into slot 162 of armature 160. Upon insertion of the insulation material, a subsequent horizontal backward translation 10 of inserting member 124 may follow and may preferably return inserting member 124 to its position prior to inserting insert 126 into slot 162. Alternatively, inserting member 124 may translate in any suitable manner to push insert 126 into slot 162 and then return to its original position.

Prior to insertion, forming member 180 may form insert 126 by translating in vertical downward direction 40 through a forming die structure (not shown). Examples of forming die structures may be illustrated and described in aforementioned U.S. Pat. No. 4,878,292 and U.S. Reissue Pat. No. 34,195, which are hereby incorporated by reference herein. The forming die structure may be any suitable structure which may be used to at least partially form insert 126 for insertion into slot 162. The conclusion of the translational motion in downward vertical direction 40 may obtain alignment of insert 126 with inserting member 124 and with slot 162 of the armature 160, where insertion of member 124 into slot 162 may occur. Thereafter, forming member 180 may be returned its original position prior to insertion, by translating in upward vertical direction 20.

The armature of the insulation machine (e.g., armature 160) or any other suitable armature may be substantially cylindrical and may have a plurality of lamination slots (e.g., slot 162) penetrating the outer circumference as illustrated in FIG. 1. An index rotation of armature 160 may align an uninsulated slot with insertion member 124 for subsequent similar insertion operations. A mechanism which carries out the index rotation may be, for example, a pawl which engages armature 160. Such a pawl may turn armature 160, or any suitable armature, such that an uninsulated slot is positioned for receiving an insulation insert (e.g., insert 126). Examples of pawl movement to accomplish an index rotation of armature 160 may be illustrated and described in U.S. Pat. No. 4,878,292 and U.S. Reissue Pat. No. 34,195, which are hereby incorporated by reference herein.

Insulating material may be any type of material having appropriate malleability and insulating properties for insertion into interior walls of dynamo-electric components. Prior to forming insert 126, a strip of insulating material 122 may be cut into a segment of predetermined length and placed beneath forming member 180. This may be achieved by feeding insulating material 122 far enough beyond cutting member 182 to have a sufficient length for insulating slot 162, and thereafter descending cutting member 182 in vertical downward direction 40 to achieve the cut. Cutting member 180 may be returned to its position prior to its downward descent by translating in upward vertical direction 20.

With reference to FIG. 1, drive mechanism 200 may be enclosed within casing 100, which may have lateral sides 110 and 150, front and back sides 130 and 170, and top side and bottom side respectively referenced 190 and 195.

Shaft 186 protrudes vertically from support block 184 on top side 190 of casing 100. Arm 188 is shown affixed to the protruding end of shaft 186. Forming member 180 may be preferably affixed to arm 188. Drive mechanism 200 may move shaft 186 in vertical directions 20 or 40. Vertical movements of shaft 186 may produce vertical movements of arm 188, which in turn may impart vertical movements upon forming member 180 for the purpose of forming and aligning insert 126, as described in the forgoing.

Similarly, shaft 142 may protrude vertically from support block 140. Drive mechanism 200 may move shaft 142 in vertical directions 20 or 40. An arm (not shown for sake of clarity) similar to arm 188 may be affixed to the protruding end of shaft 142 and may carry cutting member 182. In this manner, vertical movements of shaft 142 may produce similar vertical movements of arm 188 and cutting member 182. Vertical movements of cutting member 182 may cut insulation material 122 as described above.

Inserting member 124 may be guided with guides (not shown), placed on top side 190 of casing 100. The guides may be positioned to allow translations of inserting member 124 in directions 30 or 10 (parallel to top side 190 of casing 100). Inserting member 124, with rack 128 on its underside (shown in FIG. 3), may engage toothed wheel 252 (also shown in FIG. 3) protruding from top side 190 of casing 100. Alternative clockwise and counter-clockwise rotation of toothed wheel 252 may accomplish translations in directions 30 or 10 of rack 128, which may carry inserting member 124 in a similar direction. The movements of toothed wheel 252, inserting member 124, and their related parts are discussed further with reference to FIG. 3, FIG. 5 and FIG. 6.

In FIGS. 1–4, subsections of drive mechanism 200 are shown. Drive mechanism 200 may generate the above-mentioned vertical movements of shafts 186 and 142 in directions 20 or 40 and may rotate toothed wheel 252 about its center axis according to a predetermined timing sequence. The timing sequence may be determined, at least in part, by main shaft 230 (illustrated in FIGS. 2–4). Shaft 230 may be positioned along axis 210 (illustrated in FIGS. 1–4), which may be inside casing 100 (illustrated in FIG. 1) and may extend perpendicular to lateral sides 110 and 150 (also illustrated in FIG. 1). Shaft 230 may be supported for rotation by bearings (not shown) mounted on lateral sides 110 and 150 of casing 100. As illustrated in FIG. 1, motor 220 and belt transmission 215 may drive pulley wheel 214, which may be rigidly mounted on shaft 230 to rotate shaft 230 at a predetermined speed.

Figure 2:
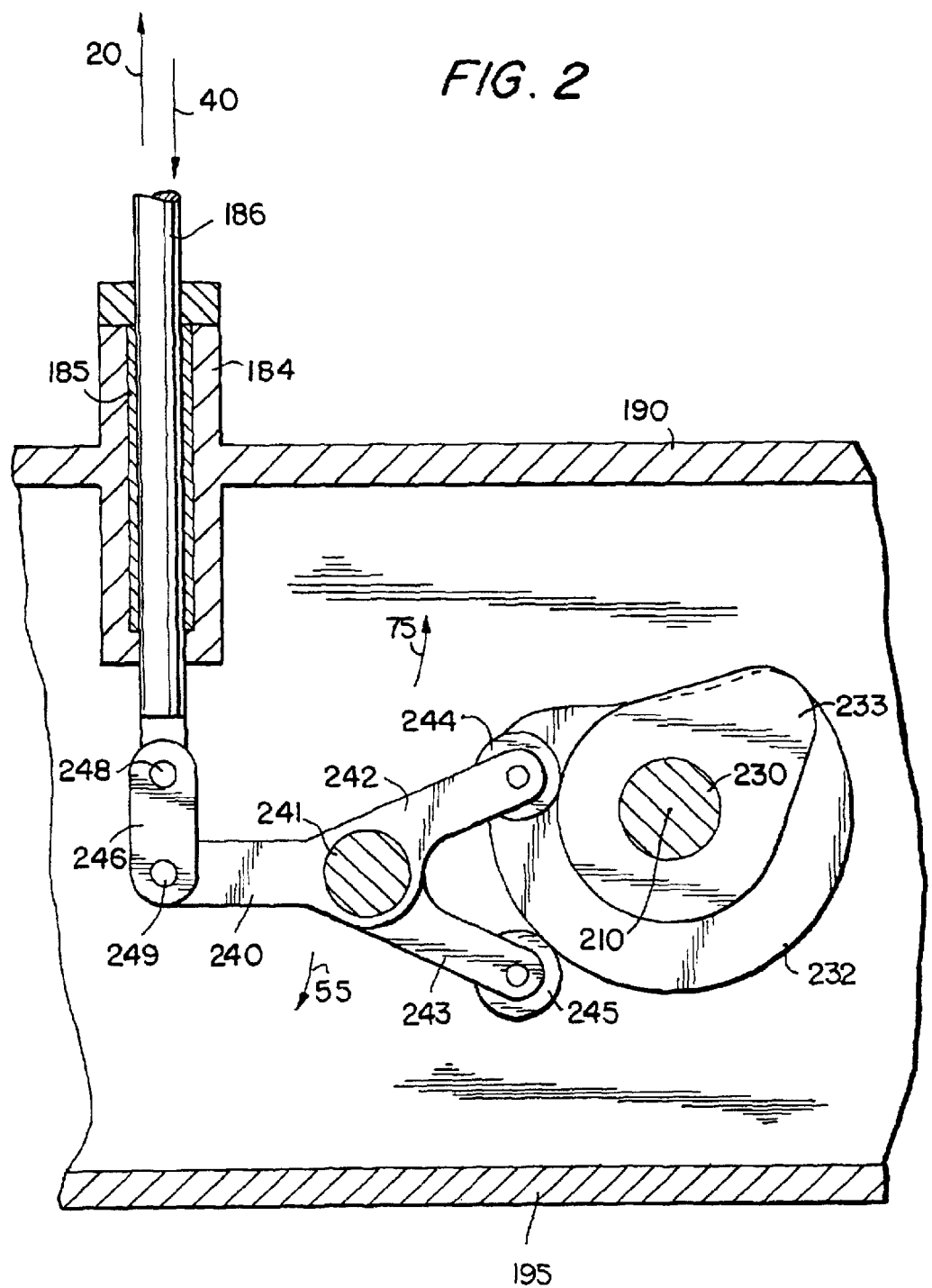
FIG. 2 is a partial section view, as seen from the direction of casing side 150 (illustrated in FIG. 1), of a subsystem of drive mechanism 200 (illustrated in FIG. 1) for controlling the forming of a segment of insulation material into a predetermined shape.

With reference to FIG. 2, cams 232 and 233 may be preferably rigidly mounted on shaft 230 so that they may rotate for similar rotational amounts imparted to shaft 230. Cams 232 and 233 may be in parallel planes substantially parallel to casing side 110 (illustrated in FIG. 1). Cam 232 may be in a first plane, closer to casing side 110 than a second plane containing cam 233. Shaft 186 may be guided by bushing 185 of support block 184. Shaft 186 may be hinged to lever 246 at pivot 248. Lever 246 may be hinged to yoke member 240 at pivot 249. Yoke 240 may have two arms, 242 and 243. Yoke 240 and arms 242 and 243 may be rotatably mounted on shaft 241 so that the relative angular position of arms 242 and 243 may vary. Rollers 244 and 245 may be rotatably mounted on arms 242 and 243, respectively. Roller 244 may be in frictional contact with cam 233 such that rotation of cam 233 about axis 210 may rotate roller 244. Roller 245 may be in similar frictional contact with cam 232.

Rotation of cams 232 and 233 may cause movement of yoke 240 and arms 242 and 243. Yoke 240, arms 242 and 243 and their respective rollers 244 and 245, may simultaneously move in directions 55 or 75. The movements of yoke 240, arms 242 and 243, and rollers 244 and 245, may be a function of the relative profiles of cams 232 and 233, the geometry of arms 242 and 243, the position of shaft 241 with respect to shaft 230, or by any other suitable means. This may preferably impede either roller 244 or roller 245 from losing contact with its respective cam 232 or 233. The distance separating shaft 241 and shaft 230 may be adjustable so that the contact of rollers 244 and 245 with cams 232 and 233 may be set to minimize play. Such an arrangement may be referred to as an anti-jump cam drive. This anti-jump cam drive, as described in the forgoing, may translate shaft 186 in directions 20 or 40 via the movements of yoke 240. The motion may be caused by rotation of cams 232 and 233. In this manner, the appropriate displacement and speed profiles of forming member 180 (illustrated in FIG. 1) may be generated as a function of the rotation imparted to shaft 230, the timing used to rotate shaft 230, or by any other suitable means.

With reference to FIG. 3, toothed wheel 252 may engage rack 128 underneath inserting member 124. Toothed wheel 252 is shown protruding from top side 190 of casing 100 so that it may engage rack 128. Toothed wheel 252 may be rotatably mounted on shaft 250 for rotation about the longitudinal center axis of shaft 250. A portion of toothed wheel 252 within casing 100 may engage gear portion 266 of yoke 260. Yoke 260 may be provided with arms 262 and 263. Yoke arms 262 and 263 may be coupled with rollers 264 and 265. Yoke 260, with arms 262 and 263, may be rotatably mounted on shaft 261. Roller 264 may be in frictional contact with cam 234. Similarly, roller 265 may be in frictional contact with cam 235. Cams 234 and 235 may be rigidly mounted on shaft 230 so that rotation of shaft 230 about axis 210 may rotate cams 234 and 235 about axis 210. Cam 235 may be mounted on shaft 230 closer to casing side 110 (illustrated in FIG. 1) than cam 234. The distance between shaft 261 and shaft 230 may vary so that the contact of rollers 264 and 265 with cams 234 and 235 may be adjusted to minimize play. An anti-jump cam drive, similar to the cam drive illustrated in FIG. 2 and described above, may thereby be established.

The anti-jump cam drive may move gear portion 266 of yoke 260 in directions 50 or 70. The movement of yoke 260 in directions 50 or 70 may preferably be done in a manner that may accomplish appropriate motion of inserting member 124 in directions 30 or 10. Toothed wheel 252 may interact with rack 128 and may move inserting member 124 in directions 10 or 30. For example, a movement of yoke 260 in direction 50 may rotate toothed wheel 252 counterclockwise, which may cause rack 128 and inserting member 124 to translate in direction 30. This interaction may have a balancing effect on the insulating machine. Thus, rotation of cams 234 and 235 by shaft 230 and the swinging motion of yoke 260 around shaft 261 as described in the foregoing may cause inserting member 124 to translate in directions 30 and 10. Accordingly, the desired displacement and speed profiles of inserting member 124 may be generated as a function of the rotation of shaft 230, the timing used to rotate shaft 230, or by any other suitable means.

With reference to FIG. 4, a subsystem of drive mechanism 200 (illustrated in FIG. 1) is shown for moving shaft 142 in directions 20 or 40 so that cutting member 182 (illustrated in FIG. 1) may cut insulating material 122 (illustrated in FIG. 1) as described in the foregoing. In this respect, shaft 142 may be guided by bushing 141 in support block 140 and may be hinged at pivot 284 to lever 282. Arm 280 may be hinged at pivot 288 to lateral side 110 of casing 100 (illustrated in FIG. 1). Lever 282 may be hinged at pivot 285 to arm 280. In this way, arm 280 may pivot about pivot 288 (in directions 60 or 80) and may move shaft 142 in directions 20 or 40. Roller 286 may be hinged at pivot 287 to arm 280 so that roller 286 may rotate about pivot 287. Cam 238 may be rigidly mounted on shaft 230 so that rotations of shaft 230 about axis 210 may cause similar rotations of cam 238. Roller 286 may be in frictional contact with cam 238 so that rotation of cam 238 may rotate roller 286. Contact between roller 286 and cam 238 may be maintained by spring 281, coupled to arm 280, which may react against casing floor 195. Rotation of cam 238 by shaft 230 and the swinging motion of arm 280 around pivot 288 may translate shaft 142 in directions 20 or 40. Translation of shaft 142 in directions 20 or 40 may preferably cause cutting member 182 (FIG. 1) to follow similar translations in directions 20 or 40. Translation imparted upon cutting member 182 may preferably be in accordance with its desired displacement and speed profiles as a function of the rotation of shaft 230, the timing used to rotate shaft 230, or by any other suitable means.

The cams as described in the foregoing (e.g. cams 232, 233, 234, 235, and 238) and illustrated in FIGS. 2–4 may be mounted on shaft 230 so that they may be in a predetermined angular position with respect to each other. The shapes of cams 232, 233, 234, 235, and 238 and their relative angular positions may be chosen to determine the displacement and relative timing of cutting member 182, forming member 180, and inserting member 124 (illustrated in FIG. 1). In this manner, cutting member 182, forming member 180, and inserting member 124 may achieve their desired displacement and speed profiles with respect to each other and as a function of the rotation of shaft 230. Any suitable timing that may be used to control the rotation of shaft 230 may time the forming, cutting, and inserting operations performed by the members of the insulating machine.

Drive mechanism 200 (illustrated in FIG. 1) may control the speed and displacement profiles of a plurality of output members (e.g., shafts 186 and 142 illustrated in FIG. 1, toothed gear 252 illustrated in FIG. 3, etc.). The plurality of output members may extend at least partially out of top side 190 of casing 100 and may be coupled with the operating members illustrated in FIG. 1 (e.g., cutting member 182, forming member 126, inserting member 124, etc.) or any other operating member of the insulating machine. In this manner, the operating members may also be moved with the appropriate displacement and speed profiles.

Since drive mechanism 200 may be surrounded by a casing, it may be possible to lubricate elements of a drive mechanism for an insulating apparatus, such as those shown in FIGS. 2–4, with a low risk of contaminating the insulating material with lubricant. The exits of the output members (e.g., shaft 186 and 142, toothed gear 252, etc.) from casing top side 190 (e.g., above drive mechanism 200) may enable greater operator accessibility to the insulation material, to the operating members listed above, and to any other external member. The subsystems of drive mechanism 200 shown in FIGS. 2–4 may obtain high accuracy and reliability of the forming, cutting and inserting operations even at high speeds of shaft 230. The speed of shaft 230 may determine the number of forming, cutting, and inserting operations, and may therefore, at least partially, determine the productivity of the insulating machine.

FIG. 5 is a view similar to FIG. 2 illustrating inserting member 500 which may be used to insert insulating members (e.g., insulating member 520) for covering coils that may have already been wound in the slots of armatures. Insulating members, such as insulating member 520, are commonly called "wedges." A wedge may be inserted by a machine which may be used downstream in a production facility with respect to the coil winder. Inserting member 500 may be used to receive wedge 520 in recess 522, and to insert it into the armature slot (e.g., slot 162 illustrated in FIG. 1). Clearance region 524 at the front of member 500 may be used to clear the way between the top of the coil wires and the ceiling of the slots for passage of the wedge.

Inserting member 500 may have a suitable trajectory for inserting wedge 520 into a dynamo-electric machine component. For example, inserting member 500 may first move vertically downward (displacement 620) to receive wedge 520 in recess 522. Next, inserting member 500 may have horizontal displacement 640 to insert wedge 520 into a slot of an armature while wedge 520 is in recess 522. Thereafter, inserting member 520 may a have a vertical upward displacement 660 to leave the wedge in the slot after insertion. Finally, inserting member 500 may have horizontal backward displacement 680 to retrieve the inserting member back to the start position of these movements in preparation for another insertion operation.

Backward or forward horizontal displacements of inserting member 500, such as displacements 640 or 680, may be achieved by using drive member 546 (illustrated in an enlarged view in FIG. 6). Horizontal displacements 640 or 680 of drive member 546 may be generated by a subsystem (e.g., the subsystem illustrated in FIG. 3) for moving inserting member 124. Connection rod 540 may connect inserting member 500 to drive member 546 through hinged lever 544. Connection rod 540 may be supported in guide structure 542 for horizontal movements 640 or 680, or any other suitable movement thereof. Lever 544 may be hinged to the connection rod, to drive member 546, or to a combination thereof. Guide structure 542 may have vertical displacements 620 or 660 driven by a subsystem of drive mechanism 200 (see FIG. 1) similar to the subsystem illustrated in FIG. 2 for moving shaft 186. The cams for moving drive member 546 and guide structure 542 may have profiles that obtain a predetermined sequence of displacements (e.g., displacements 620, 640, 660, 680, etc.). These movements may achieve the desired displacement and speed profiles of an inserting member, as a function of the rotation of shaft 230, the timing used to rotate shaft 230, or by any other suitable means.

Thus, methods and apparatus for dynamo-electric machine insulation handling, preferably capable of providing insulation inserts for the slots of the lamination core of an armature, are provided. Persons skilled in the art will appreciate that the principles of the present invention can be practiced by other than the described embodiments, which are presented for purposes of illustration and not of limitation, and the present invention is limited only by the claims which follow.

The invention claimed is:

1. An apparatus for insulating interior walls of lamination slots of dynamo-electric machine components comprising:
    a cutting member for cutting a strip of insulation material into a segment having a predetermined length;
    a forming member for forming the cut segment of insulation material into a predetermined shape;
    an inserting member for inserting the formed segment of insulation material into the lamination slot;
    a central control device comprising a single shaft and a first, second, and third plurality of cams coupled to a longitudinal axis of the shaft, wherein the first plurality of cams controls the cutting member, the second plurality of cams controls the forming member, and the third plurality of cams controls the inserting member.

2. The apparatus defined in claim 1, wherein each cam of the first plurality of cams is sufficiently contacted by a roller coupled to at least one arm of a first yoke.

3. The apparatus defined in claim 2, wherein play between the rollers and the first plurality of cams is minimized.

4. The apparatus defined in claim 1, wherein each cam of the second plurality of cams is sufficiently contacted by a roller coupled to at least one arm of a second yoke.

5. The apparatus defined in claim 4, wherein play between the rollers and the second plurality of cams is minimized.

6. The apparatus defined in claim 1, wherein each cam of the third plurality of cams is sufficiently contacted by a roller coupled to at least one arm of a third yoke.

7. The apparatus defined in claim 6, wherein play between the rollers and the third plurality of cams is minimized.

8. An apparatus for insulating interior walls of lamination slots of dynamo-electric machine components comprising:
    a cutting member for cutting a strip of insulation material into a segment having a predetermined length;
    a forming member for forming the cut segment of insulation material into a predetermined shape;
    an inserting member for inserting the formed segment of insulation material into the lamination slot;
    a central control device comprising a single shaft and a first, second, and third plurality of cams coupled to a longitudinal axis of the shaft, wherein:
        the central control device is enclosed by a casing containing lubricant for lubricating the central control device.

9. An apparatus for insulating interior walls of lamination slots of dynamo-electric machine components comprising:
    a cutting member for cutting a strip of insulation material into a segment having a predetermined length;
    a forming member for forming the cut segment of insulation material into a predetermined shape;
    an inserting member for inserting the formed segment of insulation material into the lamination slot;
    a central control device comprising a single shaft and a first, second, and third plurality of cams coupled to a longitudinal axis of the shaft, wherein:
        the central control device is enclosed by a casing containing lubricant for lubricating the central control device; and
        there are a plurality of protruding members that implement, at least in part, the control of the cutting member and the forming member, wherein the plurality of protruding members protrude from the same side of the casing.

10. The apparatus defined in claim 9, wherein the insulation material is external to the casing.

* * * * *